United States Patent [19]

Hoisington et al.

[11] Patent Number: 5,105,204
[45] Date of Patent: Apr. 14, 1992

[54] SUBTRACTIVE COLOR HOT MELT INK REFLECTION IMAGES ON OPAQUE SUBSTRATES

[75] Inventors: Paul A. Hoisington, Thetford Center, Vt.; Steven J. Fulton, Hanover, N.H.; Charles W. Spehrley, Jr., Hartford, Vt.; Lawrence R. Young, West Lebanon, N.H.

[73] Assignee: Spectra, Inc., Hanover, N.H.

[21] Appl. No.: 560,081

[22] Filed: Jul. 27, 1990

Related U.S. Application Data

[63] Continuation-in-part of Ser. No. 272,005, Nov. 15, 1988, and a continuation-in-part of Ser. No. 202,488, Jun. 3, 1988, and a continuation-in-part of Ser. No. 416,158, Oct. 2, 1989, which is a continuation-in-part of Ser. No. 230,797, Aug. 10, 1989, Pat. No. 4,873,134.

[51] Int. Cl.$^5$ ............................................. G01D 15/16
[52] U.S. Cl. ................................... 346/1.1; 346/140 R
[58] Field of Search ................... 346/1.1, 140, 75, 76; 400/126; 250/316.1, 319

[56] References Cited

U.S. PATENT DOCUMENTS

4,751,528  6/1988  Spehrley, Jr. et al. ............. 346/140
4,873,134  10/1989 Fulton et al. ...................... 428/156

OTHER PUBLICATIONS

"Principles of Color Technology", by F. W. Billmeyer, Jr. and Max Saltzman, 2nd Ed., pp. 137-141.

Primary Examiner—Mark J. Reinhart
Attorney, Agent, or Firm—Brumbaugh, Graves Donohue & Raymond

[57] ABSTRACT

In the particular embodiments of the invention described in the specification, an opaque subtractive color ink reflection print having improved color purity resulting from reduced frosting and crystallization of the ink layers is prepared by reheating the ink image to a temperature above the melting point of at least one of the inks and then quenching the image by cooling it at a rate of at least 50° C. per second. In one embodiment, the ink image is produced by an ink jet head applied to a substrate supported on a platen maintained at least 20° C. below the melting point of the inks to inhibit spreading of the inks into the substrate, and the image is thereafter heated to a temperature at least 20° C. above the melting point of at least one of the inks for a period of 3 to 5 seconds and then quenched at a rate of 500° C. per second to produce an image having less than 20% light loss resulting from scattering of light by frosting and crystallization of the ink in the layers.

11 Claims, 1 Drawing Sheet

SUBTRACTIVE COLOR HOT MELT INK REFLECTION IMAGES ON OPAQUE SUBSTRATES

REFERENCE TO RELATED APPLICATIONS

This application is a continuation-in-part of the copending Hoisington et al. Application Ser. No. 07/272,005, filed Nov. 15, 1988, now U.S. Pat. No. 4,971,408, for "HOT MELT INK PRINTING", the copending Spehrley Jr. Application Ser. No. 07/202,488, filed June 3, 1988, now U.S. Pat. No. 4,951,067, for "CONTROLLED INK DROP SPREADING IN HOT MELT INK JET PRINTING", and the copending Fulton et al. Application Ser. No. 07/416,158, filed Oct. 2, 1989, now U.S. Pat. No. 5,023,111, for "TREATMENT OF HOT MELT INK IMAGES", which is a continuation-in-part of the Fulton et al. Application Ser. No. 07/230,797, filed Aug. 10, 1988, now U.S. Pat. No. 4,873,134, for "HOT MELT INK PROJECTION TRANSPARENCY". The disclosure of those patents are incorporated by reference herein.

BACKGROUND OF THE INVENTION

This invention relates to subtractive color hot melt ink reflection images formed on opaque substrates such as paper and to methods for making such images.

Hot melt inks are used in thermal transfer printers and in certain ink jet printers. The characteristics of these inks is that they are solid at room temperature, are liquefied by heating for application, and are resolidified by cooling on the printed substrate. Colored reflection prints may be made by applying successive layers containing different subtractive colors onto an opaque substrate such as paper. In contrast to conventional additive color printing processes in which small opaque colored dots of different color are printed in side-by-side relation and the eye of the observer integrates the combined effect of the light reflected from different colored dots, subtractive color printing utilizes transparent superimposed layers of different colors which act successively on the same light rays to produce reflected light rays having a desired color.

Subtractive color hot melt ink reflection images may be prepared by applying successive different-colored layers comprising individual drops of the ink by an ink jet system, for example, or by transferring successive ink layers of uniform thickness to the substrate if a thermal transfer process is used. In each case, the colored ink image printed on the substrate is produced by a single ink layer or by the combined effect of successive layers through which light is reflected from the opaque substrate to the eye of the observer.

Heretofore, it has been understood that colored ink projection images printed on a transparent base to provide a projection transparency must be substantially transparent, i.e., without significant quantities of impurities, crystalline content or frosted surfaces, and nonrefractive, i.e., without significant dispersion of light by lenslets formed by individual drops of ink on the surface of the transparency, in order to project a remote image of the transparency in full color with a projection lens. Such difficulties in the preparation of transparencies containing hot melt color ink images may be overcome, for example, by using the procedures described in the Fulton et al. U.S. Pat. No. 4,873,134. According to that patent, the problems associated with hot melt ink color transparencies can be eliminated by maintaining the hot melt ink image at a temperature above its melting point for a selected time, thereby permitting the hot melt ink spots to spread so as to reduce the curvature of the lenslets formed by the spots, and then cooling the ink rapidly to inhibit crystallization and frosting of the ink, which could scatter the light transmitted through the transparency away from the path to the projection lens and detract from the projected image produced by a projection lens.

Moreover, in the Spehrley, Jr., et al. U.S. Pat. No. 4,751,528, a hot melt ink jet system is described in which the temperature of the platen supporting a paper substrate to which ink is supplied by an ink jet is controlled at a selected level which is related to the melting point of the ink so as to permit the ink to spread to a desired extent within the paper before solidification. Heretofore, however, the effect of crystallization and frosting of hot melt ink applied to an opaque substrate such as paper to produce subtractive color reflection images has not been considered and no attempt has been made to reduce such crystallization or surface frosting of ink spots in color images on paper.

For example, as described in Billmeyer and Saltzman (*Principles of Color Technology*, 1981), Kubelka and Munk ("Ein Beitrag zur Optik der Farbanstriche", Z. tech. Phys. v12, pp. 593–601, 1931) advanced a theory to predict the color created by applying ink to paper. The theory uses two functions to describe each ink on paper: an absorption coefficient and a scattering coefficient, both of which are functions of wavelength. The general printing industry usually makes a major simplification to the Kubelka-Munk theory: it assumes that the scattering component of the Kubelka-Munk theory is due to scattering by the paper, and the absorption component is due to the ink. Moreover, inks in general use in the printing industry do not have a crystallinity problem, or no such problem has been recognized. In one case in which the Kubelka-Munk theory was used to solve a practical problem, scattering of light was a significant contributor to poor image color, but the scattering was attributed to the paper substrate.

SUMMARY OF THE INVENTION

Accordingly, it is an object of the present invention to overcome the above-mentioned disadvantages of the prior art.

Another object of the invention is to provide a new and improved method for producing subtractive color hot melt ink images on opaque substrates.

A further object of the invention is to provide a hot melt subtractive color ink image on an opaque substrate having improved color quality.

These and other objects of the invention are attained by applying one or more layers of different-colored hot melt inks to a substrate to form a colored image and heating the layers of ink to a temperature above the melting point of at least one of the inks and thereafter cooling the layers at a rapid rate to inhibit crystallization and frosting of the ink. Because of reduced crystallization and frosting of the ink, subtractive color hot melt ink reflection images on opaque substrates prepared in accordance with the invention exhibit substantially greater color purity than corresponding conventional hot melt ink images. Preferably, as described in the Hoisington et al. Application Ser. No. 07/272,005, filed Nov. 15, 1988, each layer of ink is applied to the substrate at a temperature which is low enough to prevent substantial spreading of the ink into the substrate and the temperature and duration of the subsequent reheating are controlled so as to permit the ink to spread to a desired extent into the substrate prior to cooling.

BRIEF DESCRIPTION OF THE DRAWING

Further objects and advantages of the invention will be apparent from a reading of the following description in conjunction with the accompanying drawings, in which.

DESCRIPTION OF PREFERRED EMBODIMENTS

Figure 1:
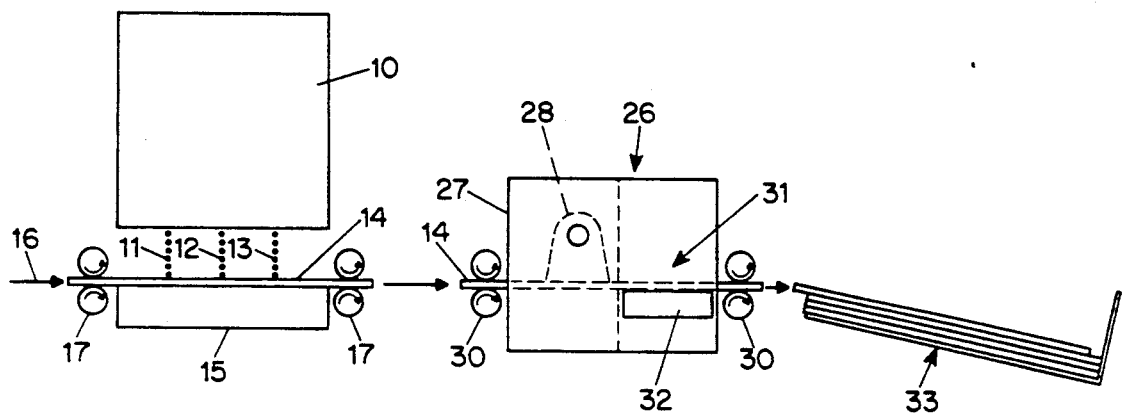
FIG. 1 is a schematic diagram showing a typical arrangement for printing subtractive color hot melt ink images on opaque substrates in accordance with the invention.

In the representative subtractive color hot melt ink reflection image printing system shown in the drawing, an ink jet head 10 is mounted in the usual manner to scan in a direction perpendicular to the plane of the drawing and project successive streams 11, 12 and 13 of drops of different-colored hot melt ink while scanning onto an opaque substrate 14 such as paper supported on a platen 15. In order to produce a subtractive color reflection image on the substrate, the substrate is moved past the ink jet head in the direction indicated by the arrow 16 in FIG. 1 by drive rolls 17 and the streams of drops 11, 12 and 13 are applied to the substrate in a controlled pattern.

In prior ink jet printing systems, such as described in U.S. Pat. No. 4,751,528, for example, the temperature of the platen 15 is controlled so that the substrate temperature is kept at a high enough level with respect to the melting point of the ink to cause the ink to flow and penetrate to a desired degree into the substrate. This procedure prevents the formation of raised ink spots and images with embossed characteristics which have poor adhesion and may be easily scraped off, while at the same time avoiding excessive flow of the ink into the substrate so as to prevent a print-through condition.

In such prior art systems, since the cooling of the image after heating is not controlled, the ink cools and solidifies at a relatively slow rate, permitting crystallization of the ink and frosting of the surface of the upper layer of ink. Such crystallization and frosting scatter light which is transmitted through the upper layers to the lowest layer adjacent to the substrate during passage in both directions through those layers, which causes the ink image to be degraded in color.

Figure 2:
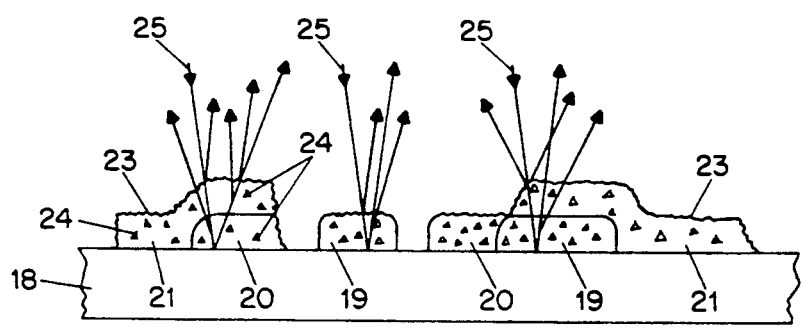
FIG. 2 is an enlarged schematic fragmentary cross-sectional view of a typical multicolor hot melt ink image of the prior art.

This is illustrated in the enlarged fragmentary schematic view of FIG. 2 in which an opaque substrate 18 includes portions of layers 19, 20 and 21 of three different subtractive colors forming a reflection image. In some regions, the substrate has only one layer and, in other regions, one or two layers are superposed on the first layer. Where the three subtractive colors are superposed, the resulting image will appear black and the improvement provided by the invention is not necessary. Consequently, no such regions are illustrated in FIG. 2. Although the portions of the layers 19, 20 and 21 are illustrated as segments of planar layers, it will be understood that, in an ink jet system, such layers are initially in the form of drops or groups of adjacent drops.

In the fragmentary image segment illustrated in FIG. 2, the uppermost layer in each portion has a relatively rough or "frosted" surface 23 and each ink layer includes a substantial proportion of crystalline material 24 which was formed during cooling of the ink layers. As a result, a significant proportion of incident rays 25 of light are scattered by the surface portions 23 or the crystalline material 24 within the ink layers so that they do not pass through the ink layers and return to the observer with the appearance of a pure color. Instead, the color of the rays which are reflected back to the observer from one portion is diluted with rays of uncolored light scattered from the frosted surfaces 23 or differently colored light scattered by crystalline material 24 within the adjacent ink layers.

To overcome this problem in accordance with the invention, the hot melt ink image produced by the ink jet head 10 on the opaque substrate 14 is subjected to a further processing step in which the ink layers are reheated in a controlled manner to a temperature above the melting point, and preferably above the liquidus point, of at least one of the inks for a selected period of time and then quenched, i.e., cooled at a rapid rate, to inhibit crystallization and frosting of the inks during solidification. As used herein, the term "melting point" of an ink is as defined in the Spehrley Jr. et al. Application Ser. No. 07/202,488, filed June 3, 1988, and, as there described, the melting point of typical hot melt ink jet inks is generally about 10° C. to about 35° C. below the liquidus point of the ink.

For this purpose, the sheet 14, after printing by the ink jet unit has been completed, is passed through a heat-and-quench unit 26 as shown in FIG. 1, in which the ink layers are reheated in a heating section 27 for a short period of time, such as 0.5 to 10 seconds, and, preferably, 1 to 5 seconds, in a controlled manner to a temperature which is above the melting point, preferably above the liquidus point, of at least one of the inks, desirably 5° C. to 40° C., and, preferably, 10° C. to 30° C., above the melting point. If the inks are heated fully above their liquidus temperature, then the time during which that temperature must be maintained may be reduced, for example, to 0.1 to 0.2 seconds or less. In the illustrated embodiment, a radiant energy heater 28 is arranged to direct heating energy toward the ink on the substrate in a defined region 29 of the unit 26 and the rate of motion of the substrate through that region is controlled by the conveyor drive rolls 30. During such reheating of the ink layers in a controlled manner, the ink is permitted to spread sufficiently into the substrate 14 to cause good adhesion of the ink layers to the substrate. At the same time, the molten condition of the ink causes the frosted surface 23 and the crystalline material 24 to disappear.

In order to inhibit the reformation of a frosted surface 23 and crystalline material 24 in the ink layers, the ink image on the substrate 14 is quenched immediately after heating by rapid cooling in a cooling section 31 of the heat-and-quench unit 26. This may be accomplished by moving the substrate in contact with a quenching platen 32, maintained at a temperature substantially below the melting point of the ink, such as 10° C. to 30° C. below the melting point, as described in the Fulton et al. Application Ser. No. 07/416,158, filed Oct. 2, 1989. Preferably, the quenching platen 32 is arranged so that the cooling occurs at a rate of at least 50° C. per second, and, desirably, at a rate of at least 100° C. per second. The quenching rate required to obtain the desired reduction in crystallinity and surface frosting will depend on the characteristics of the ink. With certain inks it may be desirable to quench at an even more rapid rate, such as 500° C. to 1,000° C. per second. Following quenching, finished prints are delivered to a receiving tray 33.

Figure 3:
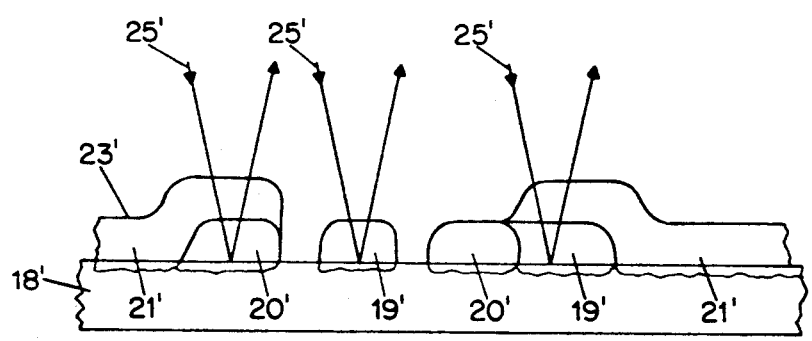
FIG. 3 is a view similar to that of FIG. 2 showing a fragment of a typical subtractive color hot melt ink image made in accordance with the invention.

As a result of the remelting and quenching of the hot melt ink image in accordance with the invention, frosting of the ink surface and crystallization within the ink layers are substantially reduced. This is illustrated in the enlarged fragmentary view of FIG. 3, which shows a portion of an improved hot melt ink reflection image prepared in accordance with the invention. In this case, a substrate 18' has segments of three different colored hot melt ink layer segments 19', 20' and 21' containing substantially no crystalline material and the uppermost surface 23' of each layer is smooth and unfrosted. As a result, incident light rays 25' can pass through all of the ink layers without scattering and are reflected from the opaque substrate 18' back to an observer with the full color of the colored ink in the layers, producing a color image of high color purity.

In conventional hot melt ink reflection images of the type shown in FIG. 2, the combined effect of surface frosting and crystallinity may result in a loss of substantially more than 35-40% of the incident light during passage through the layers, causing significant dilution of color in the reflected light rays viewed by an observer. Opaque subtractive color ink images prepared in accordance with the invention, however, substantially reduce such scattering losses to less than 30% and, in most cases, to less than about 25% or even 20%. As a result, the reflection image is not degraded significantly by scattered light of color different from the intended color.

In order to control the spread of the ink in a desired manner during reheating of the ink layers in the heating section 27 of the heat-and-quench unit, the platen 15 of the ink jet printer is preferably maintained at a low temperature with respect to the melting point of the inks, such as 20° C. to 30° C. below the lowest melting point, as described in the Hoisington Application Ser. No. 07/272,005, to inhibit drop spreading in the opaque substrate during the printing. Consequently, during the reheating step in the heat-and-quench unit 26, the temperature at which the ink is reheated and the duration of the reheating can be selected to control the spreading of the ink into the substrate in a desired manner.

For example, if the drops of ink in the streams 11, 12 and 13 have a melting point in the range 70° C. to 90° C. and the sheet 14 is held against a printing platen 15 maintained at a temperature of 50° C., spreading of the ink into the substrate during the initial printing step is inhibited. Thereafter, the substrate 14 with the ink image is reheated in the unit 26 to a temperature of, for example, 110° C. for 3 to 5 seconds, providing sufficient time for the ink drops to spread into the substrate without causing print-through. Immediately thereafter the ink is quenched by subjecting it to a temperature of, for example, 40° C. in the cooling section 31, producing a subtractive color hot melt ink reflection print having a high degree of color purity.

In another embodiment, where drop spread is intended to be fully controlled by the effects of the substrate temperature control on the printing platen, and for inks and substrates whose heat absorptivities are selected so that the inks are substantially more heat-absorbent (for example, greater than or equal to 90%) than the substrate (for example, less than 50%), then high-energy flux radiant heating may be used to selectively remelt the inks for a very short period of time (for example, 100-200 msec.), such that the relatively cool substrate prevents significant drop spreading.

Although the invention has been described herein with reference to specific embodiments, many modifications and variations therein will readily occur to those skilled in the art. Accordingly, all such variations and modifications are included within the intended scope of the invention.

We claim:

1. A hot melt ink reflection color print comprising an opaque substrate and an ink pattern on the surface of the substrate containing at least one transparent layer of subtractive color hot melt ink wherein light scattered by frosting and crystallinity in the ink layer from light rays passing through the layer to the opaque substrate is no more than about 30% of the light in the rays incident on the layer.

2. A hot melt ink reflection color print according to claim 1 wherein the ink pattern contains at least two different subtractive color inks and wherein the light scattered by frosting and crystallinity in the ink layers is no more than about 30% of the light in the rays incident on the layers.

3. A hot melt ink reflection print according to claim 1 wherein the light scattered by frosting and crystallinity in the ink is no more than about 25% of the light in the rays incident on the layer.

4. A hot melt ink reflection print according to claim 1 wherein the light scattered by frosting and crystallinity in the ink is no more than about 20% of the light in the rays incident on the layer.

5. A method for preparing a hot melt ink reflection print comprising forming a subtractive color hot melt ink image containing at least one layer of transparent subtractive color hot melt ink on an opaque substrate, maintaining the ink in the image to a temperature above the melting point of at least one of the inks for a period of at least 0.1 seconds, and thereafter cooling the ink at a rate of at least 50° C. per second.

6. A method for preparing a hot melt ink reflection print according to claim 5 wherein the ink is maintained at a temperature above its melting point for about 0.5 to 10 seconds.

7. A method for preparing a hot melt ink reflection print according to claim 5 wherein the ink is maintained at a temperature above its melting point for about 1 to 5 seconds.

8. A method for preparing a hot melt ink reflection print according to claim 5 wherein the ink is maintained at a temperature from about 5° C. to about 40° C. above the melting point of at least one of the inks.

9. A method for preparing a hot melt ink reflection print according to claim 5 wherein the ink is maintained at a temperature within the range from about 10° C. to about 30° C. above the melting point of at least one of the inks.

10. A method for preparing a hot melt ink reflection print according to claim 5 wherein the ink is cooled at a rate of at least 100° C. per second.

11. A method for preparing a hot melt ink reflection print according to claim 5 wherein the ink is cooled at a rate of about 500° C. to about 1,000° C. per second.

* * * * *